United States Patent
Ohoka et al.

(10) Patent No.: US 8,474,860 B2
(45) Date of Patent: Jul. 2, 2013

(54) DISPLAY APPARATUS FOR VEHICLE

(75) Inventors: Kenichi Ohoka, Tokyo (JP); Kiyotaka Kokuzawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 24 days.

(21) Appl. No.: 13/236,940

(22) Filed: Sep. 20, 2011

(65) Prior Publication Data

US 2012/0074674 A1  Mar. 29, 2012

(30) Foreign Application Priority Data

Sep. 29, 2010  (JP) ................. 2010-218166

(51) Int. Cl.
*B60R 21/215* (2006.01)
*B60R 21/203* (2006.01)

(52) U.S. Cl.
USPC ....................... 280/728.3; 280/731

(58) Field of Classification Search
USPC ............ 280/728.3, 731, 730.2, 732; 340/438, 340/461
See application file for complete search history.

(56) References Cited

U.S. PATENT DOCUMENTS

| | | | | |
|---|---|---|---|---|
| 5,415,554 A * | 5/1995 | Kempkers et al. | ............... | 439/34 |
| 5,979,933 A * | 11/1999 | Murar et al. | .................. | 280/731 |
| 6,860,508 B2 * | 3/2005 | Keutz | ............................ | 280/731 |
| 6,983,170 B2 * | 1/2006 | Stulberger | ................. | 455/556.1 |
| 2004/0173999 A1 * | 9/2004 | Thomas et al. | ............. | 280/728.3 |
| 2008/0224453 A1 * | 9/2008 | Downey | ..................... | 280/728.3 |
| 2008/0309764 A1 * | 12/2008 | Kubota et al. | ................. | 348/148 |
| 2009/0189373 A1 * | 7/2009 | Schramm et al. | ............. | 280/731 |

FOREIGN PATENT DOCUMENTS

| | | | |
|---|---|---|---|
| DE | 10133896 A1 * | 1/2003 | |
| JP | 2009-96210 A | 5/2009 | |
| WO | WO 2005032893 A1 * | 4/2005 | |

OTHER PUBLICATIONS

Ribbon Cable Definition, McGraw-Hill Dictionary of Scientific & Technical Terms, 6E, Copyright © 2003 by the McGraw-Hill Companies, Inc.*

* cited by examiner

*Primary Examiner* — Joseph Rocca
(74) *Attorney, Agent, or Firm* — McDermott Will & Emery LLP (57) ABSTRACT

A display apparatus for a vehicle provided in an interior member of the vehicle that covers an airbag device and has specified movable areas that, when a bag portion is expanded and inflated, swing and open so as to form an area through which the bag portion passes. The display apparatus for a vehicle includes displays that have a flexible sheet-like shape and that are mounted on surfaces of the respective movable areas, display control devices that are disposed at positions away from the movable areas and drive the displays in order to cause the displays to display images, and flexible wiring portions that connect the displays to the display control devices and that has flexibility so as to be able to bend when the movable areas swing.

9 Claims, 11 Drawing Sheets

DISPLAY APPARATUS FOR VEHICLE

CROSS-REFERENCE TO RELATED APPLICATIONS

The present application claims priority from Japanese Patent Application No. 2010-218166 filed on Sep. 29, 2010, the entire contents of which are hereby incorporated by reference.

BACKGROUND OF THE INVENTION

1. Field of the Invention

The present invention relates to a display apparatus for a vehicle provided in an interior member of a vehicle such as an automobile, and particularly relates to a display apparatus applicable to an interior member in which an airbag device is provided.

2. Description of the Related Art

In a vehicle such as an automobile, a variety of display apparatuses are used to display information for occupants such as a driver.

For example, an instrument panel provided, for example, in front of the driver typically displays information such as vehicle speed, engine speed, fuel amount, water temperature, and selected position of an automatic transmission, states of lamps such as turn signal lamps, and various warnings. In addition, the instrument panel includes a display screen of a navigation device, and display apparatuses of an audio device, an air-conditioning device, a clock, a fuel consumption meter, and so forth.

Such display apparatuses as above tends be increasingly used as higher-level functions are implemented in vehicles.

In the above-described situation, if a common display is used and various information can be displayed thereon by switching the contents of the display accessed through a menu screen or the like, an integral display apparatus can be provided, thereby allowing a viewing task performed by the occupants to be more easily performed. Furthermore, if the display uses a so-called touch-panel display having a position input device, an excellent user interface having improved operability and increased convenience can be achieved.

As a related-art of a display apparatus for a vehicle, for example, Japanese Unexamined Patent Application Publication No. 2009-096210 discloses a technology in which a touch-panel display is mounted in a pad portion provided in a central portion of a steering wheel, and an image displayed on the display is rotated by rotating the steering wheel.

Today, vehicles are equipped with a variety of airbag devices in interior members thereof in order to protect occupants when the vehicles are involved in car crashes or other accidents.

For example, airbag devices for frontal crash protection for a driver seat or a passenger seat are typically provided in center pads of steering wheels and at positions of instrument panels opposite the passenger seats, respectively.

In a portion of an interior member that covers such an airbag device, a fragile portion is formed by, for example, partially decreasing the thickness of the interior member. The fragile portion breaks when the airbag is expanded and inflated, and part of the interior member swings and opens so as to form a path for expanding the airbag.

The above-described center pad of the steering wheel and the position of an instrument panel opposite the passenger seat are positions at which the airbag device is typically provided. These positions are also suitable for increasing convenience when a display is provided therein. Thus, there is a demand for a display apparatus that does not interfere with the airbag device even when the display apparatus is provided in the vicinity of the airbag device.

However, the above-described related-art technology does not consider the arrangement of the display apparatus in which the display apparatus does not interfere with the airbag device even when the display apparatus is provided in the vicinity of the airbag device, and accordingly, how a path for expanding the airbag is ensured is not clear if the related-art technology is applied to an interior member that covers the airbag device.

In addition, when the airbag is expanded and inflated, the display is moved away together with the interior member. In so doing, it is not desirable that a sharp end portion of a display panel is exposed, which could injure occupants.

SUMMARY OF THE INVENTION

An object of present invention is to provide a display apparatus for a vehicle that is applicable to an interior member in which an airbag device is provided.

The present invention solves the above-described problem as follows.

According to an aspect of the present invention, a display apparatus for a vehicle is provided in an interior member of the vehicle that covers an airbag device provided with a bag portion that is expanded and inflated in response to a crash or a pre-crash of the vehicle and has a specified movable area that, when the bag portion is expanded and inflated, swings and opens so as to form an area through which the bag portion passes. The display apparatus for a vehicle includes at least one display that has a flexible sheet-like shape and that is mounted on a surface of the movable area, a display control device chat is disposed at a position away from the movable area and that drives the at least one display in order to cause the at least one display to display an image, and a flexible wiring portion that connects the at least one display to the display control device and that has flexibility so as to be able to bend when the movable area swings.

Thus, since the flexible wiring that connects the display and the display control device bends, the display can be provided in the interior member that is disposed even at a position that covers the airbag device without interfering with swinging of the interior member in which the display is provided, although the movable area of the interior member, when the hag portion is expanded and inflated, swings so as to ensure the expansion and inflation path of the bag portion, and in so doing, the display also swings together with the interior member.

In addition, since the display control device can be disposed at a position at which the display control device does not interfere with the expansion and inflation of the bag portion (position other than the movable area of the interior member), the versatility of the design can increase.

Preferably, the interior member has a fragile portion that breaks due to an input from the bag portion when the airbag device is operated, at least part of end portions of the at least one display is disposed along the fragile portion. The interior member includes a display end protecting portion that is integrally formed with the interior member so as to cover the end portion of the at least one display.

Thus, when the bag portion of the airbag device is expanded and inflated, and the movable area of the interior member moves away, a situation in which the occupants would be injured by sharp ends of the sheet-like display can be avoided due to covering of the end portion of the at least one display with the display end protecting portion.

Preferably, the at least one display includes a plurality of displays provided adjacent to each other with the fragile portion disposed therebetween, and the plurality of displays form a multi-display.

Thus, the multi-display uses the plurality of displays provided with the fragile portion, at which the interior member breaks, disposed therebetween. This allows a sufficient display area to be ensured without interfering with the breakage of the interior member and the expansion and inflation of the bag portion even when portions where the displays are disposed overlap the fragile portion.

Preferably, the at least one display is a light-emitting display.

Thus, a separate light source such as a backlight is not required for the display. This allows the thickness of the display to be reduced and the display to be easily mounted in the interior member.

Such a light-emitting display may use, for example, a known organic electro-luminescence (EL) display.

Preferably, the at least one display may be a touch-panel display having means for inputting a position that is provided so as to overlap a display portion of the touch-panel display.

Thus, while various information is displayed to the occupant, a variety of input operations corresponding to display contents can be performed by the driver, thereby further increasing the convenience.

Preferably, the at least one display is provided in a center pad of a steering wheel.

Thus, the display can be provided in front of the driver, and the visibility for the driver can be increased.

Preferably, the center pad includes means for preventing rotation that prevents the center pad from rotating relative to a vehicle body even when a rim portion of the steering wheel rotates.

Thus, a displayed image does not rotate even when a steering operation is performed, thereby allowing convenience to be further increased.

Preferably, the at least one display is provided in an interior member that is part of a surface of an instrument panel disposed so as to oppose a passenger seat, and the airbag device is an airbag device for a passenger seat contained in the instrument panel.

Thus, the display can be provided in front of the passenger seat, and the visibility for the occupant sitting in the passenger seat can be increased.

Preferably, the at least one display is provided in an interior member that is part of a pillar trim, and the airbag device is an airbag device for side crash protection, at least part of which is contained in the pillar trim.

Thus, a field of view interrupted by, for example, a pillar can be compensated by displaying on the display an image from a camera that takes an external image, thereby allowing the blind spot to be decreased, and accordingly, the ease of the driving to be increased.

As described above, according to the present invention, the display apparatus for a vehicle can be provided, which is applicable to the interior member in which the airbag device is provided.

DESCRIPTION OF THE PREFERRED EMBODIMENTS

The present invention achieves a goal of providing a display apparatus for a vehicle applicable to an interior member in which an airbag device is mounted by providing a touch-panel organic electro-luminescence (EL) display in the interior member that swings when the airbag is expanded, by connecting the organic EL display to a display controller device using flexible printed circuit boards, and by covering an end of the organic EL display with part of the interior member.

First Embodiment

A first embodiment of the display apparatus for a vehicle according to the present invention will be described below.

Figure 1:
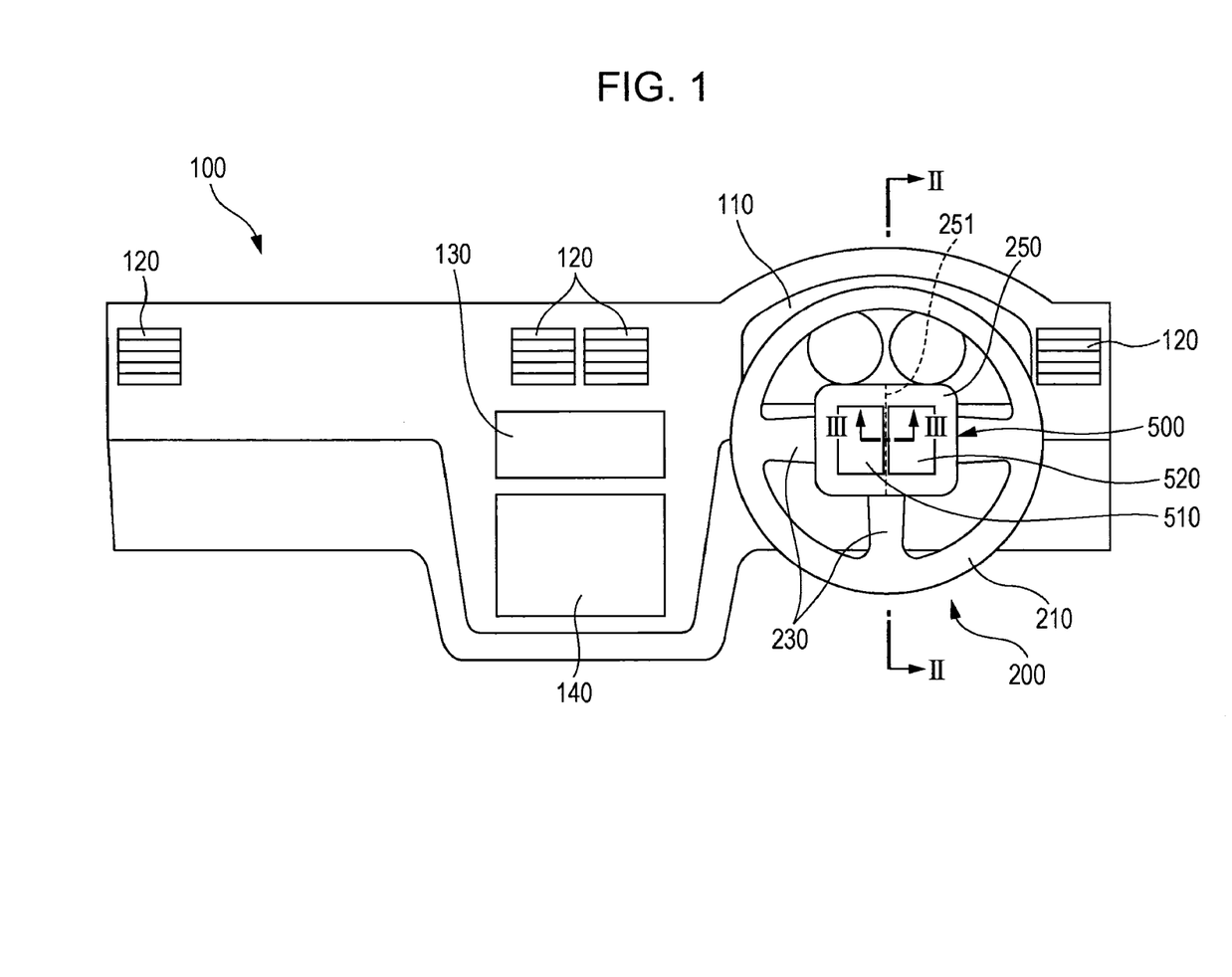
FIG. 1 is a schematic external view of a steering wheel and an instrument panel of a vehicle that includes a first embodiment of a display apparatus for a vehicle according to the present invention, seen from an occupant side (rear side of the vehicle)

FIG. 1 is a schematic external view of an interior of vehicle that includes the display apparatus for a vehicle of the first embodiment, seen from an occupant side.

Figure 2:
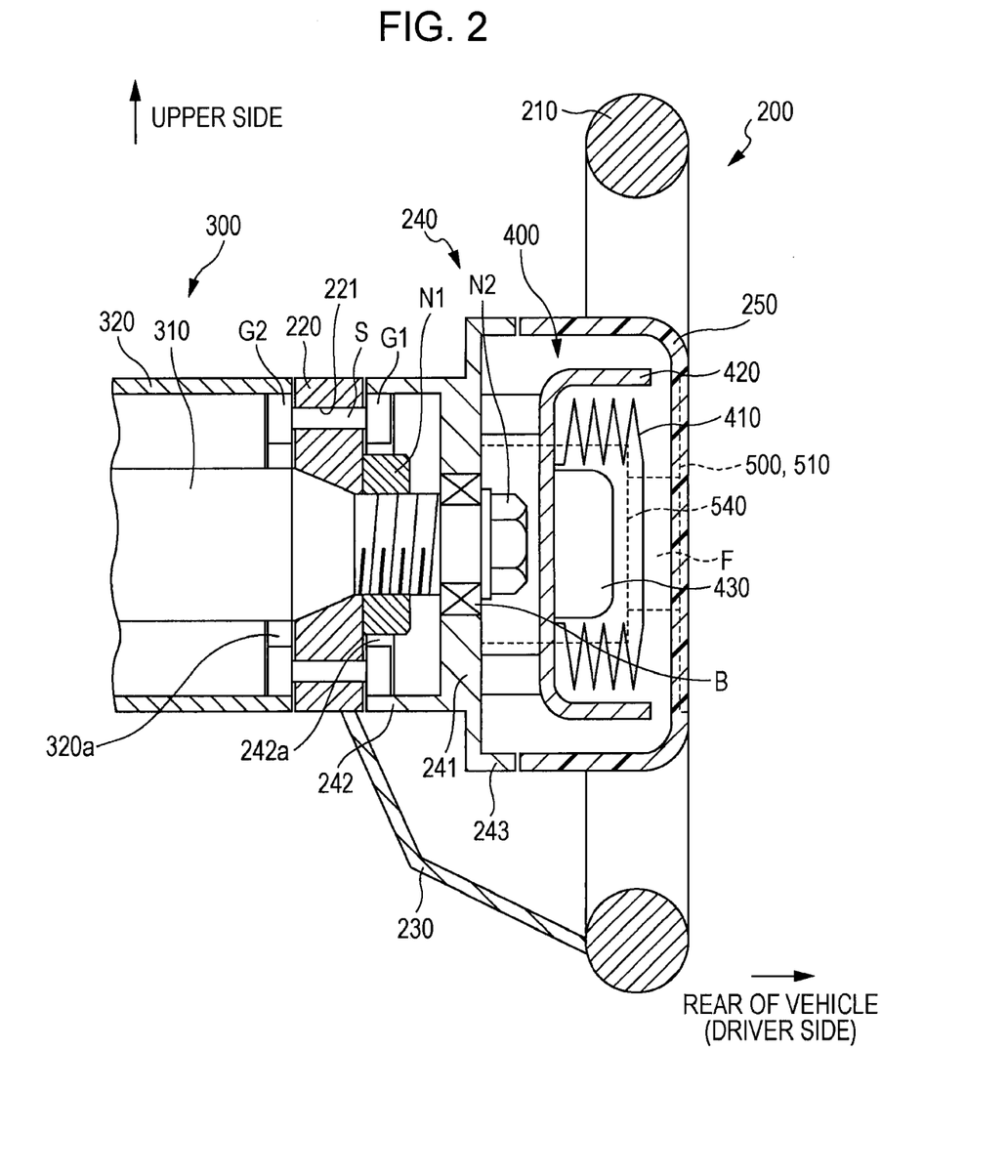
FIG. 2 as an arrow sectional view of a portion illustrated in FIG. 1 taken along line II-II in FIG. 1.

FIG. 2 is an arrow sectional view of the interior of the vehicle taken along line II-II in FIG. 1, which illustrates a sectional view in a vertical plane including a rotation axis of a steering wheel.

Figure 3:
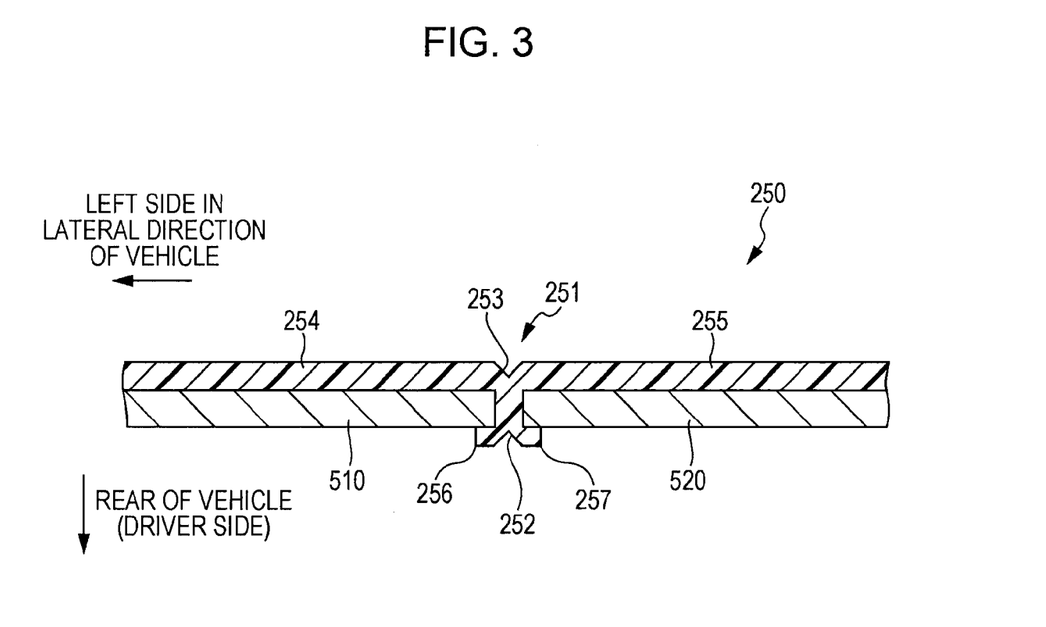
FIG. 3 is an arrow sectional view of a portion illustrated in FIG. 1 taken along line in FIG. 1.

FIG. 3 is an arrow sectional view of the interior of the vehicle taken along line III-III in FIG. 1, which illustrates a sectional view of a fragile portion and a vicinity thereof in a center pad of the steering wheel.

Figure 4:
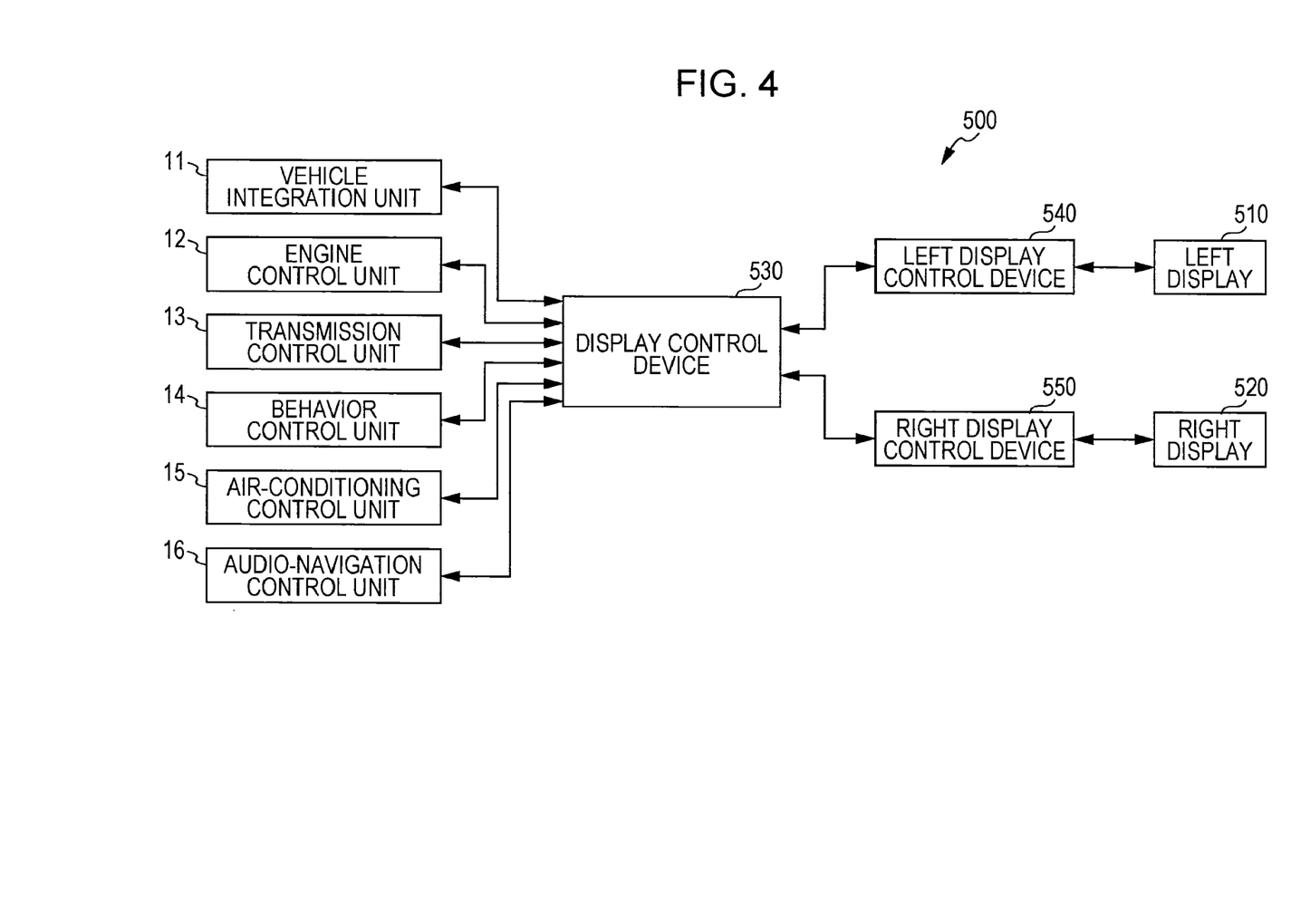
FIG. 4 is a schematic block diagram that illustrates a configuration of the display apparatus for a vehicle illustrated in FIG. 1.

FIG. 4 is a schematic block diagram chat illustrates a system configuration of the display apparatus for a vehicle of the first embodiment.

Figure 5A:
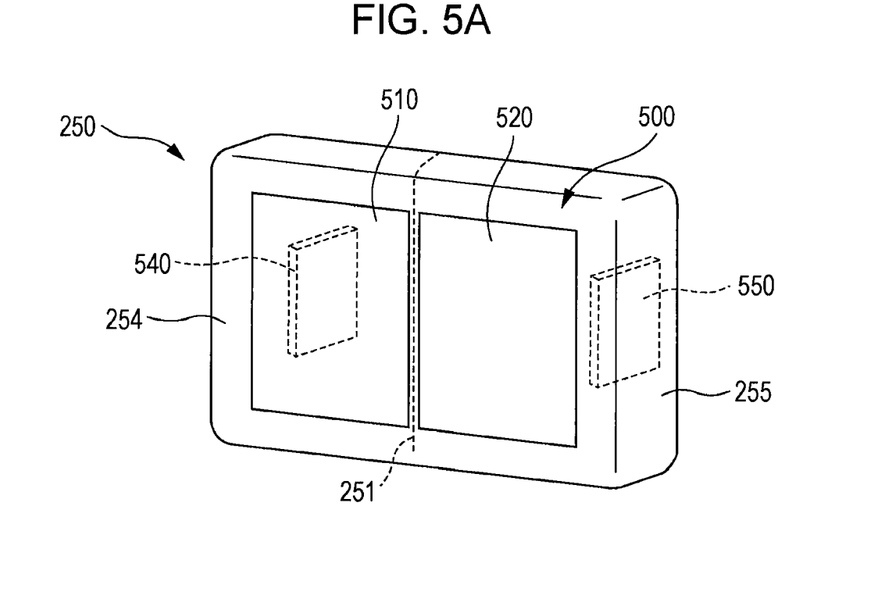
FIGS. 5A and 5B are schematic external perspective views of a center pad of the steering wheel before and after the expansion of an airbag in an airbag device.
Figure 5B:
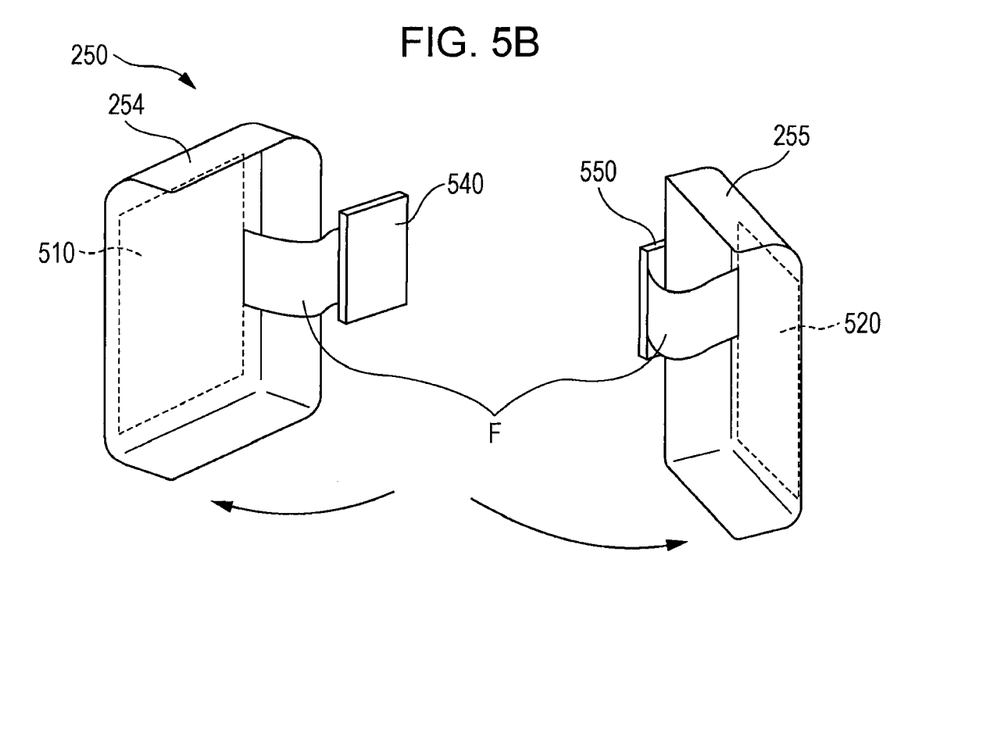

FIGS. 5A and 5B are schematic external perspective views of the center pad: FIG. 5A illustrates a state of an airbag device before the airbag device is operated, and FIG. 5B illustrates a state of the airbag device after the airbag device is operated.

The vehicle includes an instrument panel 100, a steering wheel 200, a steering system 300, an airbag device 400, a multi-display 500, and so forth.

The instrument panel (dashboard) 100 is an interior member provided at a front end of a vehicle cabin, a surface portion of which is formed of a resin-based material or the like having a shock absorbing property and incombustibility.

The instrument panel 100 includes a meter unit 110, air-conditioning outlets 120, an air-conditioning operation panel 130, an audio-navigation device operation panel 140, and so forth mounted therein.

The meter unit 110 displays information about running condition of the vehicle to a driver. The meter unit 110 includes, for example, a speed meter, engine tachometer, a fuel gage, an engine cooling water temperature meter, a distance meter, a position indicator for transmission, an indicator indicating status of various lamps, and other warning lamps mounted therein.

Through the air-conditioning outlets 120, air blown by a blower from a heating, ventilating and air-conditioning (HVAC) unit that functions as a heater, a ventilator, and an air-conditioner flows into the vehicle cabin. The air-conditioning outlets 120 are disposed at, for example, left and right end portions and the central portion of the instrument panel 100 where appropriate.

The air-conditioning operation panel 130 includes variety of switches used by an occupant in order to operate the above-described heater, ventilator, and air-conditioner functions. The air-conditioning operation panel 130 is disposed, for example, below the central air-conditioning outlet 120.

The audio-navigation device operation panel 140 includes components such as a variety of switches used by the occupant in order to operate an audio-navigation device and a liquid crystal display device on which a navigation screen is displayed. The audio-navigation device operation panel 140 is disposed, for example, below the air-conditioning operation panel 130.

Some or all of the functions of the meter unit 110, the air-conditioning operation panel 130, and the audio-navigation device operation panel 140 described above can also be accessed using the multi-display 500, which is a touch-panel display.

The steering wheel 200 is used by the driver in order to input steering operations and includes, as illustrated in figures such as FIG. 2, a rim 210, a hub 220, spokes 230, an airbag base 240, a center pad 250, and so forth.

The rim 210 is an annular-shaped member, which is held by the driver in order to perform steering operations.

The hub 220 is a disc-shaped member provided near a rotation axis of the rim 210 and secured to a steering shaft 310 so as to be substantially concentric therewith. The hub 220 is fastened to a taper portion formed near a proximal end portion of the steering shaft 310 with a nut N1.

The hub 220 has an opening 221 formed therein. A later-described gear shaft S is inserted into the opening 221 and rotatably supported by the hub 220.

The spokes 230 are members that connect the rim 210 to the hub 220, and each secured to an inner periphery portion of the rim 210 and an outer peripheral surface of the hub 220. The spokes 230 are provided, for example, at both sides and below the hub 220 when the steering wheel 200 is oriented in a straight ahead position.

The airbag base 240 is provided on the driver side relative to the hub 220, and is a member that forms a base portion to which the airbag device 400 and the center pad 250 are mounted.

The airbag base 240 includes a main body portion 241, a cylindrical portion 242, a flange portion 243, and so forth.

The main body portion 241 is a plate-shaped member extending along a plane that is substantially perpendicular to a center axis of the steering shaft 310 and is formed to have a substantially rectangular shape in plan view seen from the driver side.

The main body portion 241 is supported with a bearing B an outer ring of which is assembled in a central portion of the main body portion 241 such that the main body portion 241 is rotatable relative to the steering shaft 310. An inner ring of the bearing B is secured to the steering shaft 310 with the nut N2.

The cylindrical portion 242, which protrudes from a rear surface (the hub 220 side surface) of the main body portion 241, is provided so as to be concentric with the steering shaft 310 and the hub 220. The cylindrical portion 242 is formed to have a substantially the same inner diameter as a steering column 320. An internal gear 242a, which is formed on an inner peripheral surface of the cylindrical portion 242, is engaged with a pinion tear G1 provided at one end of the gear shaft S.

The flange portion 243 is formed so as to protrude toward the driver side from an outer periphery portion of the main body portion 241.

The center pad 250 is a member that is provided on the driver side of the airbag base 240 and covers the airbag device 400.

The center pad 250 is formed of, for example, a resin-based material, such as a urethane-based material.

A fragile portion 251 is formed at a central portion of the center pad 250 in a lateral direction of the vehicle. The fragile portion 251 is a portion that, when a bag portion 410 of the airbag device 400 is expanded and inflated, breaks due to an input from the bag portion 410.

As illustrated in figures such as FIGS. 5A and 5B, the fragile portion 251 extends in the vertical direction along the substantially entire height of the center pad 250.

As illustrated in FIG. 3, the fragile portion 251 is formed by forming groove portions 252 and 253 having, for example, a V-shape on a front surface (surface opposing the driver) and a rear surface of the center pad 250, respectively, so as to partially decrease the thickness of the center pad 250.

When the fragile portion 251 breaks, the center pad 250 separates into a left half portion 254 and a right half portion 255 as illustrated in FIG. 5B. Both of the separated portions swing about substantially vertical rotation axes positioned near left and right ends of the center pad 250 and open so as to ensure a path (space portion) for the bag portion 410 to be expanded and inflated.

The center pad 250 also has display end protecting portions 256 and 257 integrally formed therewith that cover side end portions and areas near outer periphery portions of surface portions of a left display 510 and a right display 520, which are later described.

The above-described groove portion 252 of the fragile portion 251 is formed between the left and right display end protecting portions 256 and 257.

The steering system 300 supports the steering wheel 200 and transfers a rotational motion of the steering wheel 200 to a steering gear box (not shown), in which the rotational motion is converted into a linear motion in the lateral direction of the vehicle and transferred to hub bearing housings to which left and right front wheels are mounted.

The steering system 300 includes the steering shaft 310, the steering column 320, and so forth.

The steering shaft 310 is a rotating shaft that transfers the rotation of the steering wheel 200 to the steering gear box.

The steering column 320 is a cylindrically shaped member disposed concentrically with the steering shaft 310 and houses the steering shaft 310 therein.

An internal gear 320a is formed in an inner peripheral surface near an end portion of the steering column 320 so as to be engaged with a pinion gear G2 provided at the other end of the gear shaft S.

Here, the gear ratio of the internal gear 320a to the pinion gear G2 is set to the same as that of the internal gear 242a to the pinion gear G1.

With the above-described structure, when the rim 210 and the hub 220 rotate relative so the steering column 320, the gear shaft S driven by the pinion gear G2 rotates in a direction reverse to the rotating direction of the hub 220, and the pinion gear G1 causes the airbag base 240 to rotate relative to the hub 220. As a result, the airbag base 240 does not rotate relative to a vehicle body even when the rim 220 rotates.

The airbag device 400 includes the bag portion 410, retainer 120, an inflator 430, and so forth.

The bag portion 410 is expanded and inflated in front of the head and the chest of the driver in response to a detection of a crash or a sign of crash (pre-crash) of the vehicle so as so restrain the driver.

The bag portion 410 is contained in the retainer 420 in a folded state before the bag portion 410 is expanded and inflated.

The retainer 120 is a container-shaped member that contains the folded bag portion 410 and forms a base to which the inflator 430 is mounted. The retainer 420 is formed, for example, so have a box shape that opens toward the driver, and is secured to the main body portion 241 of the airbag base 240 of the steering wheel 200.

The inflator 430 generates an expansion gas that causes the bag portion 410 to expanded and inflated in accordance with an instruction from an airbag control unit (not shown). The inflator 430 is secured to a central portion of the retainer 420.

The multi-display 500 is provided in a surface portion of the center pad 250 of the steering wheel 200 that opposes the driver.

The multi-display 500 includes the left display 510 and the right display 520 disposed at the left and right sides seen from the driver with the fragile portion 251 disposed therebetween.

The left display 510 and the right display 520 respectively display a left half and a right half of a displayed image so as to function as a substantially single display and enlarge a substantial display area.

The left display 510 and the right display 520 are, for example, light-emitting EL displays that need no backlight and are touch-panel displays having position input devices disposed so as to overlap the image display areas. The left display 510 and the right display 520 are formed to have a flexible rectangular sheet-like shape.

As illustrated in FIG. 4, the multi-display 500 also includes a display control device 530, a left display control device 540, a right display control device 550, and so forth.

The display control device 530 generates and outputs data relating to an image displayed on the left display 510 and the right display 520.

The display control device 530 also detects inputs from the left display 510 and the right display 520, which are touch-panel displays, and transmits control signals in accordance with the input operations to a specified control unit or the like.

The display control device 530 is directly or indirectly connected to a vehicle integration unit 11, an engine control unit 12, a transmission control unit 13, a behavior control unit 14, an air-conditioning control unit 15, an audio-navigation control unit 16, and so forth so as to enable communication with these unit. The indirect connection is achieved through an onboard local area network (LAN) such as a control area network (CAN) communication system.

The vehicle integration unit 11 collectively controls a variety of electrical components such as lamps and wipers of the vehicle.

The engine control unit 12 collectively controls a vehicle engine and its auxiliaries.

The transmission control unit 13 controls an automatic transmission of the vehicle.

The behavior control unit 14 performs controls such as an anti-lock brake control and a behavior control that, when the vehicle exhibits an over-steer or an under-steer behavior, generates a yaw moment in a direction that cancels the over-steer or under-steer behavior by separately controlling braking and driving power of the left and right wheels.

The air-conditioning control unit 15 collectively controls the air-conditioner, the HVAC unit, and the like.

The audio-navigation control unit 16 collectively controls the audio-navigation device.

The left display control, device 540 and the right display control device 550 are respectively provided for the left display 510 and the right display 520.

The left and right display control devices 540 and 550 respectively supply driving electrical power to the left and right displays 510 and 520 so as to display images according to signal inputs received from the display control device 530.

The left and right display control devices 540 and 550 also respectively detect input operations performed with the left and right displays 510 and 520 and transmit the detected operations to the display control device 530.

As illustrated in FIGS. 2, 5A and 5B, the left and right display control devices 540 and 550 are disposed at positions to the left and right of the airbag device 400 such that the left and right display control devices 540 and 550 are not affected by the expansion and inflation of the bag portion 410, and are secured to the main body portion 241 of the airbag base 240.

As illustrated in FIG. 5B, flexible printed circuit boards F having flexibility connect the left display control device 540 to the left display 510 and the right display control device 550 to the right display 520.

When the bag portion 410 is expanded and inflated, the flexible printed circuit boards F bend so as not to prevent swinging of the left and right half portions 254 and 255 of the center pad 250.

Next, examples of displays on the above-described multi-display 500 will be described.

Figure 6:
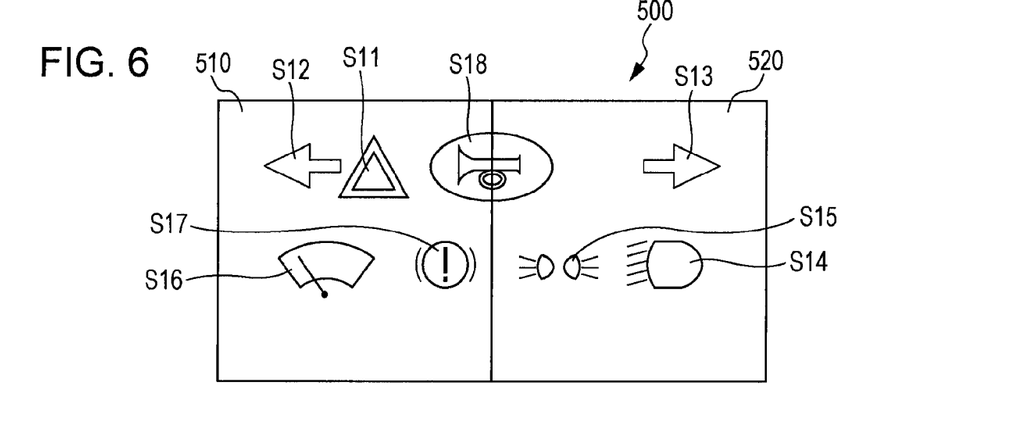
FIG. 6 illustrates an example of a screen display on the display apparatus for a vehicle illustrated in FIG. 1.

FIG. 6 illustrates an example display in which states and other information about lamps, a horn, and wipers are indicated, and with which operations such as turning on or off these components are performed.

The multi-display 500 displays a hazard symbol S11, a left-turn signal symbol S12, a right-turn signal symbol S13, a headlamp symbol S14, a width indicator lamp symbol S15, a wiper symbol S16, a parking brake symbol S17, a horn symbol S18, and so forth.

When the display area of the hazard symbol S11 is touched, the state of hazard lighting, in which the left-turn and the right-turn signal lamps are simultaneously blink, can be switched between the on state and the off state.

When the display area of the left-turn signal symbol S12 or the right-turn signal symbol S13 is touched, the corresponding turn signal lamp starts to blink. Blinking of the turn signal lamps are canceled when touching again the corresponding one of these symbols. The blinking is also canceled when a steering wheel angle sensor (not shown) detects a returning operation of the steering wheel 200.

When the headlamp symbol S14 is repeatedly touched, the state of the headlamp can be switched between the on state and the off state. When a finger that touches the headlamp symbol S14 is slid upward or downward, the lighting state of the headlamp is switched from high-beam lighting to low-beam lighting, and low-beam lighting to high-beam lighting.

When the width indicator lamp symbol S15 is repeatedly touched, the state of the width indicator lamps (small lamps) can be switched between the on state and the off state.

When the wiper symbol S16 is repeatedly touched, the state of the wipers can be switched between the on state and the off state.

When a finger that touches the wiper symbol S16 is slid upward or downward, the operating speed of the wipers can be switched and the operation of the wipers can be switched between a continuous operation and an intermittent, operation.

In addition, when the wiper symbol S16 is touched for more than or equal to a predetermined period of time (long touch), a window washer fluid can be sprayed.

When the parking brake symbol S17 is repeatedly touched, the state of an electrical parking brake device can be switched between an engaged state and a released state.

The horn symbol S18 is disposed across the left display 510 and the right display 520. When the horn symbol S18 is touched, the horn emits a sound.

Figure 7:
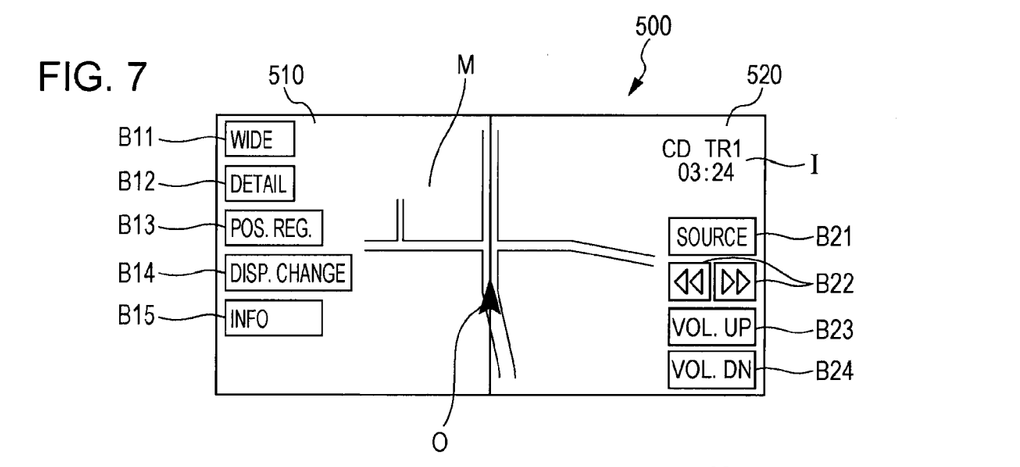
FIG. 7 illustrates another example of the screen display on the display apparatus for a vehicle illustrated in FIG. 1.

FIG. 7 illustrates an example of a display that displays a map according to a navigation device and accepts operational inputs for the navigation device and an audio device.

The multi-display 500 displays a map display M. In addition, a vehicle position marker O is superimposed on the map display M.

Near the left end portion of the multi-display 500, a wide area display button B11, a detailed display button B12, a position registration button B13, a display change button B14, and an information button B15 are displayed.

When the wide area display button B11 or the detailed display button B12 is touched, the scale of the map display M is changed so as to switch the display to a wide area display or a detailed display.

When the position registration button B13 is touched, current coordinates of the vehicle is registered.

When the display change button B14 is touched, a display mode of the map display M is switched to a different display mode such as a planar map mode, a 3D map mode, or a road map mode one after the other.

When the information button B15 is touched, information such as traffic congestion information and traffic restriction information obtained from, for example, road-to-vehicle communication is displayed.

Near a right end portion of the multi-display 500, playback information I, a source select button B21, search skip buttons B22, a volume up button B23, a volume down button B24, and so forth of the audio device are displayed.

The playback information I includes information about a current source, that is, a sound source such as, for example, a compact disc (CD), a hard disc drive (HDD), a frequency-modulated (FM) broadcast, an amplitude-modulated (AM) broadcast, or an auxiliary source (AUX). The playback information I also includes track information, or, for a tuner, information about a channel, a frequency, playback time, and so forth.

When the source select button B21 is touched, the source is switched one after the other.

When one of the search skip buttons B22 is touched, a track of a CD is selected, a track is fast forwarded, or a channel of the tuner is selected.

When the volume up button B23 or the volume down button B24 is touched, the playback sound volume correspondingly increases or decreases.

Figure 8:
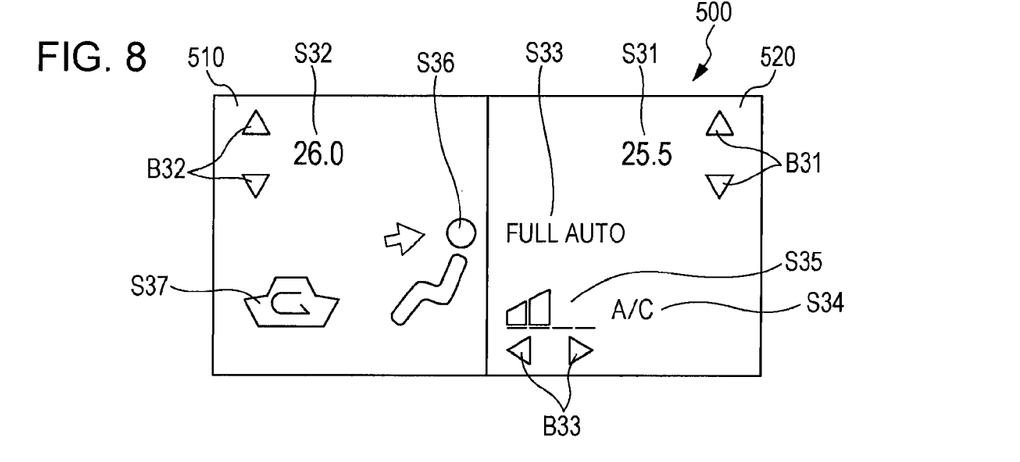
FIG. 8 illustrates still another example of the screen display on the display apparatus for a vehicle illustrated in FIG. 1.

FIG. 8 illustrates an example of a display that displays the state of a vehicle air-conditioner, which is the air-conditioning device, and accepts operational inputs.

The multi-display 500 displays a driver-seat-side set temperature display S31, a passenger-seat-side set temperature display S32, an operation mode display S33, an air-conditioner operation display S34, an air volume display S35, an air outlet mode display S36, a ventilation mode display S37, and so forth.

The driver-seat side set temperature display S31 and the passenger-seat side set temperature display S32 respectively display temperatures on the driver seat side and the passenger seat side set for the vehicle air-conditioner (control target temperatures).

The operation mode display S33 displays an operation mode such as, for example, a full-automatic mode, a manual mode, or a defroster mode.

The air-conditioner operation display S34 is an indicator displaying that an air compressor of the air-conditioner is driven.

The air volume display S35 is an indicator that displays the air volume of the blower.

The air outlet mode display S36 displays a currently used air-conditioning outlet 120. When the air outlet mode display S36 is touched, the air-conditioning outlet 120 in use can be switched.

The ventilation mode display S37 displays a current ventilation mode (inside air circulation or outside air introduction). When the ventilation mode display S37 is touched, the ventilation mode can be switched between the inside air circulation and the outside air introduction.

In the multi-display 500, driver-seat-side temperature setting buttons B31, passenger-seat-side temperature setting buttons B32, and air volume setting buttons B33 are also displayed near the driver seat side set temperature display S31, the passenger seat side set temperature display S32, and the air volume display S35. When these buttons are touched, set temperatures on the driver side and the passenger side, and the air volume of the blower can be changed.

The display screens as described above can be selected in a menu screen (not shown).

The following advantages can be obtained according to the above-described first embodiment.

(1) When the bag portion 410 of the airbag device 400 is expanded and inflated, the fragile portion 251 of the center pad 250 breaks, and the left half portion 254 and the right half portion 255 swing and move away so as to ensure an expansion and inflation path of the bag portion 410. In so doing, even if the left and right displays 510 and 520 swing together with the left and right half portions 254 and 255, swinging of the left and right half portions 254 and 255 equipped with the left and right displays 510 and 520 is not prevented due to bending of the flexible printed circuit boards F connecting the left and right displays 510 and 520 to the display control devices 540 and 550. Thus, the multi-display 500 can be disposed in the center pad 250 in which the airbag device 400 is also disposed.

In addition, the display control devices 540 and 550 can be disposed at the side portions of the airbag device 400 so as not to interfere with the expansion and inflation of the bag portion 410.

(2) When the bag portion 410 of the airbag device 400 is expanded and inflated, and the left and right half portions 254 and 255 of the center pad 250 move away, a situation in which the occupants would be injured by sharp ends of the sheet-like displays can be avoided due to covering of the end portions of the left and right displays 510 and 520 with the display end protecting portions 256 and 257.

(3) The multi-display uses the left and right displays 510 and 520 disposed with the fragile portion 251, at which the center pad 250 breaks, disposed therebetween. Thus, a sufficient display area can be ensured without interfering with breakage of the center pad 250 and the expansion and inflation of the bag portion 410 even when portions where the displays are disposed overlap the fragile portion 251.

(4) Since the left and right displays 510 and 520 use the light-emitting organic EL displays, separate light sources such as backlights are not required. Thus, the thickness of the displays can be reduced and the displays are easily mounted in the center pad 250.

(5) Since the left and right displays 510 and 520 use touch-panel displays having means for inputting positions, a variety of input operations corresponding to display contents can be performed using the displays in addition to displaying various information to the occupant. Thus, the convenience is further increased.

(6) Since the multi-display 500 is provided in the center pad 250 of the steering wheel 200, the display can be provided in front of the driver. This increases the visibility for the driver.

(7) Due to a structure in which the center pad 250 does not rotate even when the rim 210 of the steering wheel 200 rotates, a displayed image does not rotate even when a steering operation is performed. Thus, convenience of the display can be further increased.

Second Embodiment

Next, a second embodiment of the display apparatus for a vehicle according to the present invention will be described.

In embodiments to be described below, elements substantially the same as those in the above embodiment are denoted by the same signs and the descriptions thereof are omitted. The descriptions are mainly devoted to differences.

Figure 9:
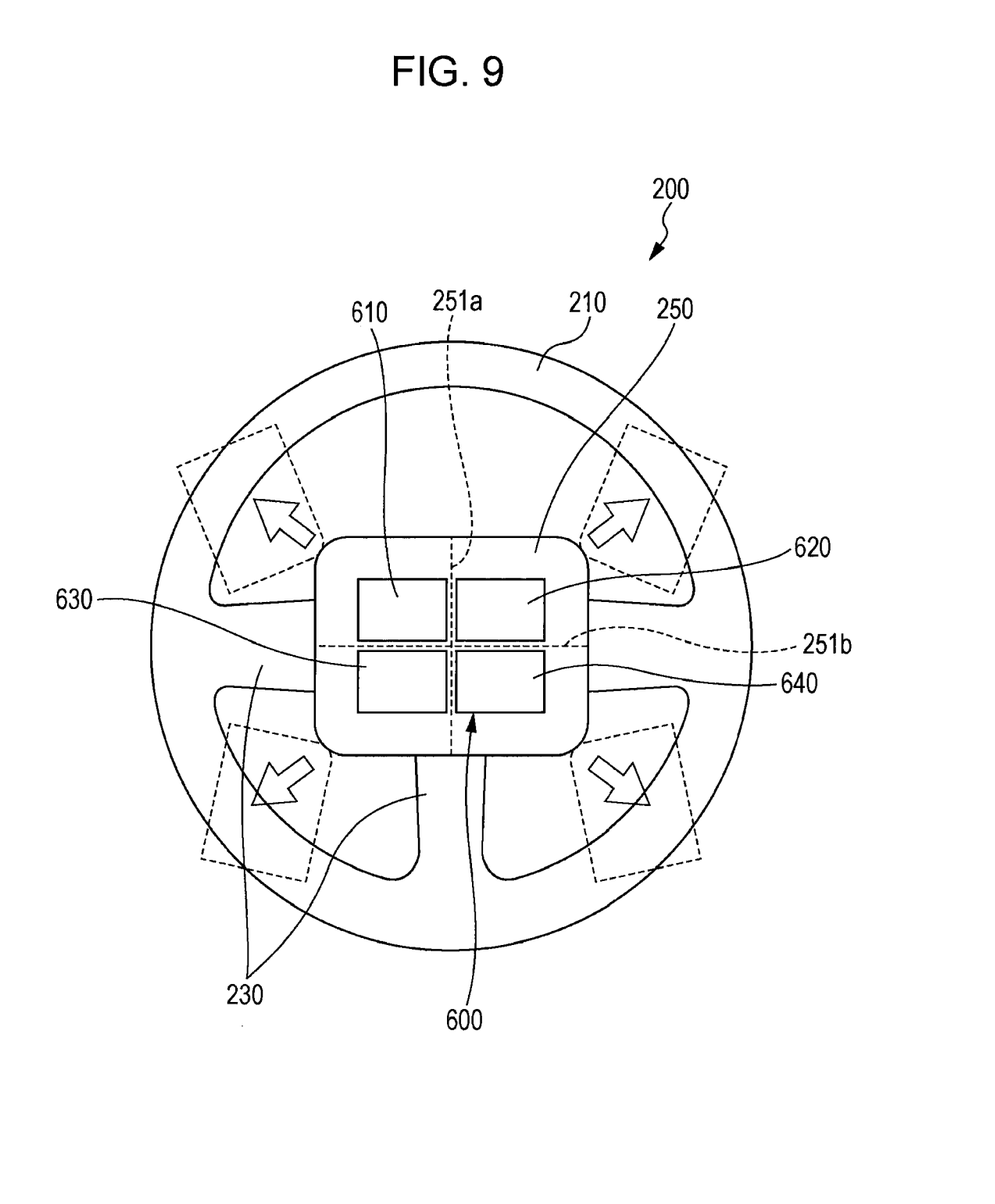
FIG. 9 is a schematic external view of a steering wheel of a vehicle that includes a second embodiment of the display apparatus for a vehicle according to the present invention.

FIG. 9 is a schematic external view of a steering wheel of a vehicle that includes the display apparatus for a vehicle of the second embodiment.

As illustrated in FIG. 9, the display apparatus for a vehicle of the second embodiment is a multi-display 600 provided instead of the multi-display 500 of the first embodiment.

In the second embodiment, fragile portions 251a and 251b are formed so as to extend in the vertical and horizontal directions respectively in the center pad 250. These fragile portions 251a and 251b intersect each other near a central portion of the center pad 250.

When the bag portion 410 of the airbag device 400 is expanded and inflated, the center pad 250 breaks at the fragile portions 251a and 251b as illustrated by the dotted lines in FIG. 9. The broken portions each pivot about an outer peripheral portion of the center pad 250 as the rotation axis so as to open outward, thereby ensuring the expansion and inflation path of the bag portion 410.

The multi-display 600 includes an upper left display 610, an upper right display 620, a lower left display 630, and a lower right display 640. These displays are disposed in corresponding areas of the center pad 250 divided by the fragile portions 251a and 251b.

In this case, each display may have a separate display control device as is the case with the above-described first embodiment, or a single display control device may control the plurality of displays. In the latter case, the single display control device is connected to the plurality of displays using flexible wiring.

According to the above-described second embodiment, in addition to the advantages similar to those of the first embodiment, by increasing the number of divided displays in the multi-display, versatility of the design with respect to the division of the center pad can increase.

Third Embodiment

Next, a third embodiment of the display apparatus for a vehicle according to the present invention will be described.

Figure 10:
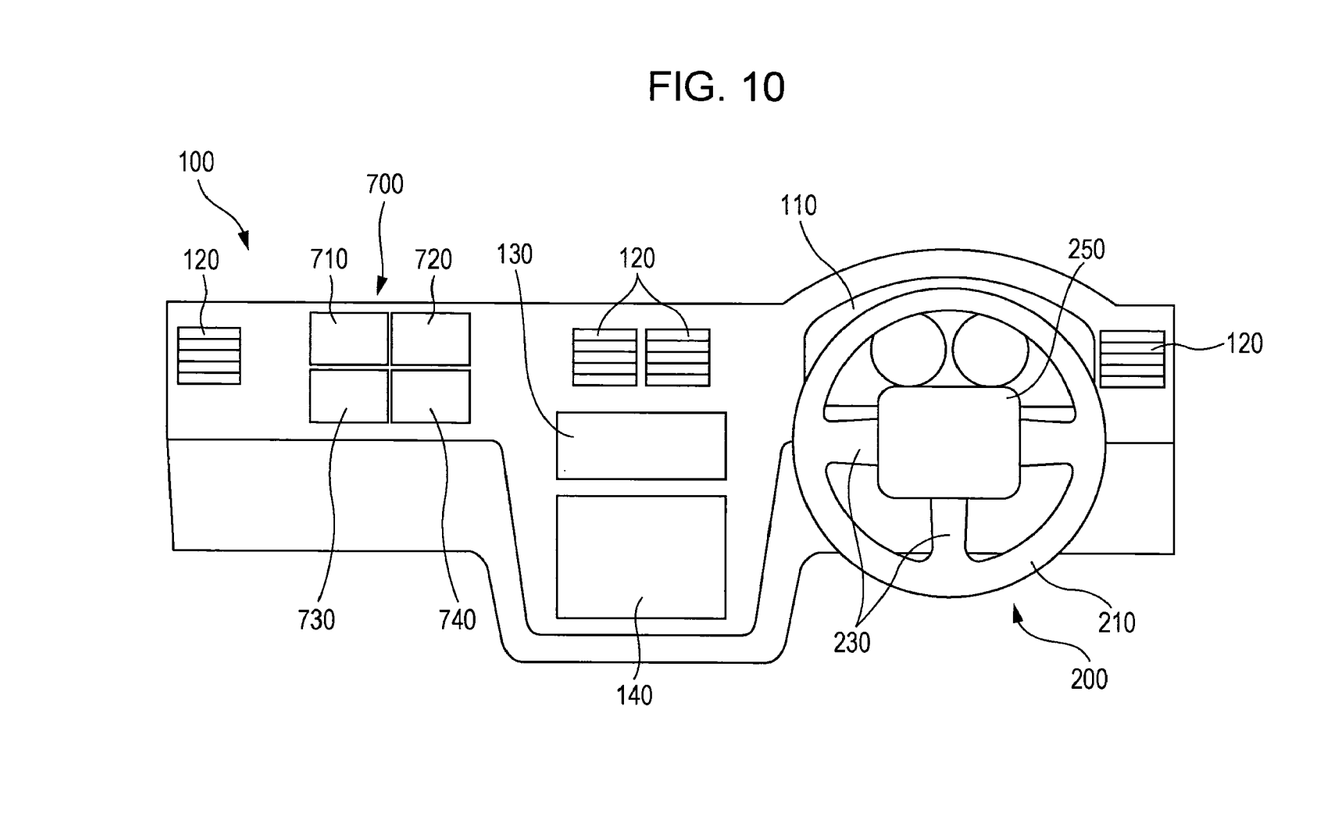
FIG. 10 is a schematic external view of a steering wheel and an instrument panel of a vehicle that includes a third embodiment of the display apparatus for a vehicle according to the present invention.

FIG. 10 is a schematic external view of a steering wheel and an instrument panel provided in a vehicle that includes the display apparatus for a vehicle of the third embodiment.

As illustrated in FIG. 10, the display apparatus for a vehicle of the third embodiment is a multi-display 700 provided instead of the multi-display 500 of the first embodiment.

The multi-display 700 is provided in the instrument panel 100 at a surface portion that opposes the occupant sitting in the passenger seat. An airbag device for passenger seat (not shown) is provided behind the multi-display 700.

As is the case with the above-described multi-display 600 of the second embodiment, the multi-display 700 includes an upper left display 710, an upper right display 720, lower left display 730, and a lower right display 740 disposed in a two-row by two-column arrangement. Fragile portions (not shown) are provided between the displays. The fragile portions break when the bag portion of the airbag device for a passenger seat is expanded and inflated. When the fragile portions break, an area of the instrument panel 100 where the multi-display 700 is disposed opens in a substantially similar way as the center pad 250 of the above-described second embodiment so as to form an expansion and inflation path of the bag portion.

According to the above-described third embodiment, the multi-display is achieved which does not interfere with the airbag device for a passenger seat even when the display apparatus is provided in the vicinity of the airbag device. Thus, advantages substantially similar to those of the first embodiment can be obtained.

Fourth Embodiment

Next, a fourth embodiment of the display apparatus for a vehicle according to the present invention will be described.

Figure 11:
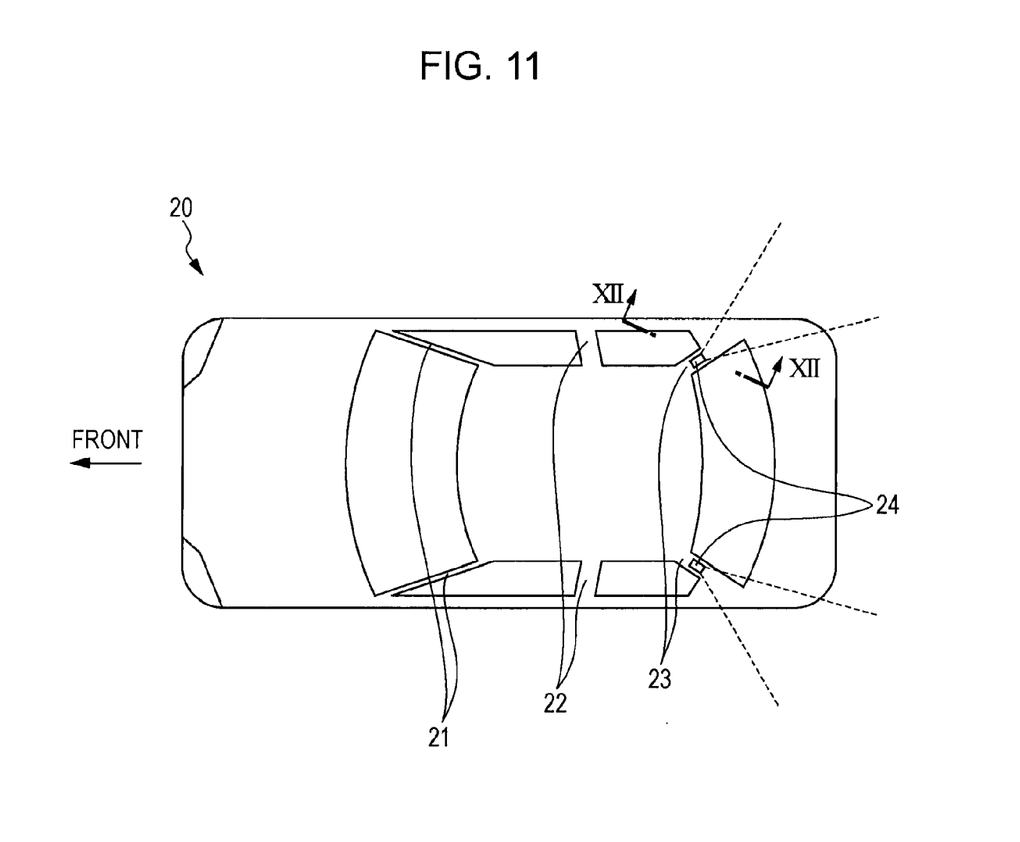
FIG. 11 is a schematic view of a vehicle that includes a fourth embodiment of the display apparatus for a vehicle according to the present invention, seen from an upper side.

FIG. 11 is a schematic view of a vehicle that includes the display apparatus for a vehicle of the fourth embodiment seen from an upper side.

As illustrated in FIG. 11, a vehicle 20 includes, sequentially from the front of the cabin, A-pillars 21, B-pillars 22, and C-pillars 23.

A camera 24 is provided on each C-pillar 23 in order to take an image of a blind spot formed by the C-pillar 23.

Figure 12:
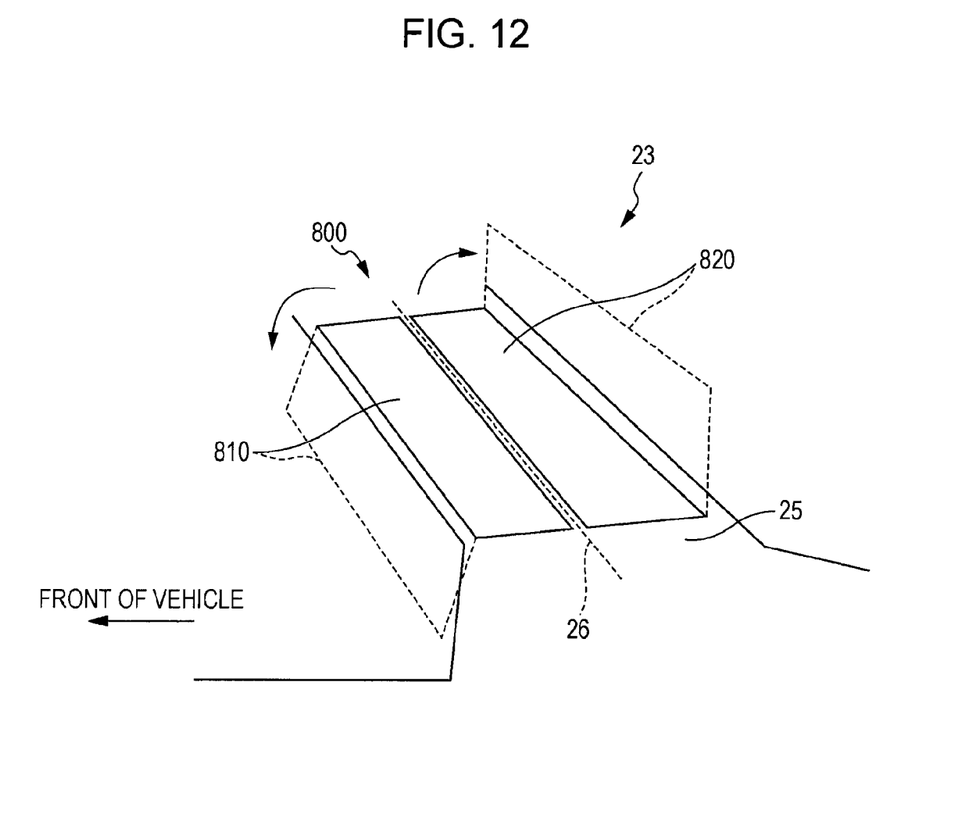
FIG. 12 is a schematic arrow view of a portion illustrated in FIG. 11 taken along line XII-XII.

FIG. 12 is a schematic arrow view of the C-pillar 23 taken along line XII-XII in FIG. 11.

As illustrated in FIG. 12, a multi-display 800 is provided in a pillar trim 25. The pillar trim 25 is an interior member formed of resin, and provided on an inner surface of the C-pillar 23.

The multi-display 800 includes a front display 810 and a rear display 820 arranged in a longitudinal direction.

The multi-display 800 displays an external image taken by the cameras 24.

The pillar trim 25 contains a curtain airbag device (not shown) thereinside including a bag portion that is expanded and inflated along the side window glass when the vehicle is involved in a side crash.

A fragile portion 26 is formed between the front display 810 and the rear display 820 of the pillar trim 25.

When the bag portion of the curtain airbag device is expanded and inflated, the fragile portion 26 breaks, and the pillar trim 25 is separated into a front half portion and a rear half portion and opens so as to ensure a path necessary for the expansion and inflation of the bag portion. At this stage, the front display 810 and the rear display 820 open respectively together with the front half portion and the rear half portion of the pillar trim 25.

According to the above-described fourth embodiment, a field of view interrupted by the C-pillar 23 can be compensated by displaying an image from the camera 24 that takes external images on the multi-display 800. Thus, the blind spot can be decreased, and accordingly, the ease of the driving can be increased.

In addition, the multi-display 800 does not interfere with the curtain airbag device even when the display apparatus is provided in the vicinity of the curtain airbag device.

Fifth Embodiment

Next, a fifth embodiment of the display apparatus for a vehicle according to the present invention will be described.

Figure 13A:
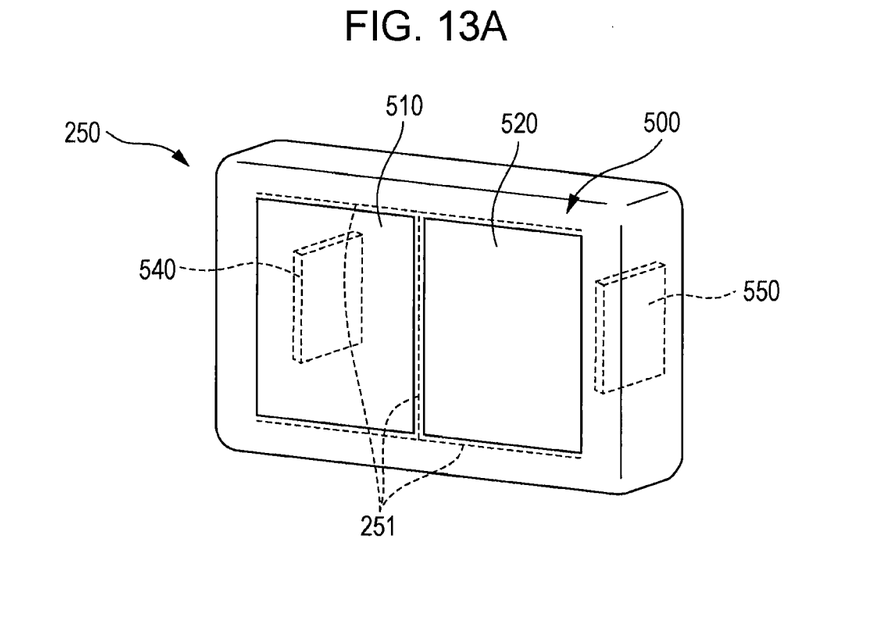
FIGS. 13A and 13B are schematic external perspective views of a center pad of a steering wheel before and after the expansion of an airbag in a fifth embodiment of the display apparatus for a vehicle according to the present invention.
Figure 13B:
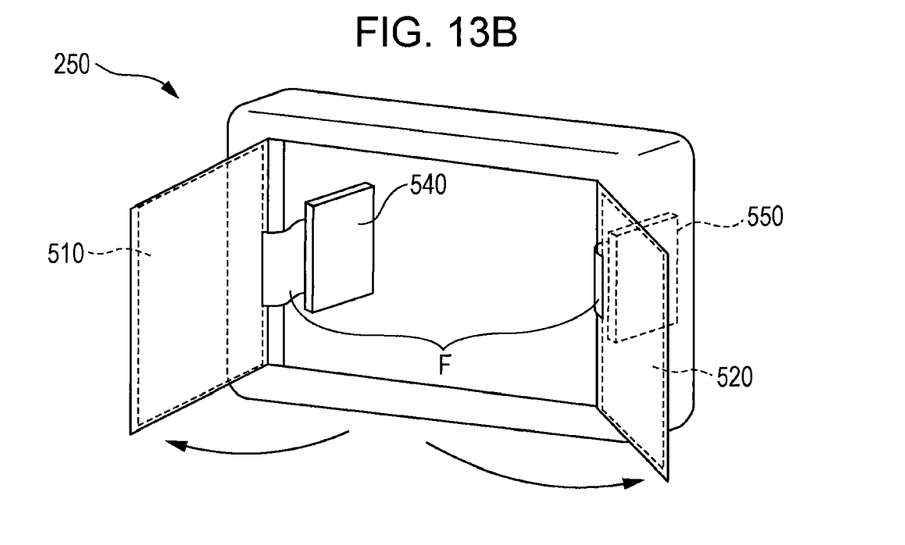

FIGS. 13A and 13B are schematic external perspective views of a center pad of a steering wheel before and after the expansion of an airbag in the display apparatus for vehicle of the fifth embodiment: FIG. 13A illustrates a state before the airbag is expanded, and FIG. 13B illustrates a state after the airbag is expanded.

In the display apparatus for a vehicle of the first embodiment, the fragile portion 251 is formed in a surface portion on the passenger side of the center pad 250. On the other hand, the display apparatus for a vehicle of the fifth embodiment has the fragile portions 251 formed at an intermediate portion between the left and right displays 510 and 520, and along upper and lower end portions of the left and right displays 510 and 520.

In the fifth embodiment, when the bag portion 410 of the airbag device 400 is expanded and inflated, the above-described fragile portions 251 break. As a result, only portions where the left and right displays 510 and 520 are disposed and their peripheral portions in the center pad 250 pivot respectively about portions near the left and right ends of the left and right displays 510 and 520 as rotation centers (hinge portions) so as to open leftward and rightward.

Also in the above-described fifth embodiment, advantages substantially similar to those of the first embodiment can be obtained.

Modifications

The present invention is not limited to the above-described embodiments variety of modifications and changes can be implemented, which are also within the technical scope of the present invention.

(1) Although the display apparatus of each embodiment is a multi-display that includes a combination of a plurality of displays, the display apparatus may include a single display. For example, in the center pad of the steering wheel, a display may be provided on one side of the fragile portion and a switch may be provided on the other side of the fragile portion.

(2) The shape of the display is not limited to a rectangular shape as the display apparatus in each embodiment has. For example, the display may have a triangular shape, a polygonal shape having more than four edges, or another shape. Arrangement of the fragile portion is not limited to the vertical or horizontal directions as those of the embodiments. The fragile portion may be arranged in a diagonal direction. The shape of the fragile portion is not limited to a linear shape. The fragile portion may have a curved shape. The method of partially decreasing strength is not limited to the use of grooves as used in the embodiments. Other methods may be used.

(3) Contents displayed on the display apparatus and, when the touch-panel display is used, targets of operations operated using the touch-panel display are not limited to those of the embodiments and may be changed where appropriate.

For example, a selecting operation with an automatic transmission and operations of devices such as a cruise controller, a power window device, a power sheet device, and a sunroof device may be performed using the touch-panel display.

(4) In the first and second embodiments, the center pad of the steering wheel does not rotate even when the rim rotates. However, the center pad and the display may rotate together with the rim. In this case, a displayed image is rotated relative to the display using an image processing so as not to rotate the image when seen from the driver.

(5) The interior member in which the display apparatus is disposed is not limited to the center pad of the steering wheel, the instrument panel, or the pillar trim of the corresponding embodiments. The display apparatus may be disposed in another interior member that covers the airbag device.

What is claimed is:

1. A display apparatus for a vehicle provided in an interior member of the vehicle, the interior member covering an airbag device provided with a bag portion that is expanded and inflated in response to a crash or a pre-crash of the vehicle, the interior member having a specified movable area that, when the bag portion is expanded and inflated, swings and opens so as to form an area through which the bag portion passes, the display apparatus for a vehicle, comprising:
   at least one display that has a flexible sheet-like shape and that is mounted on a surface of the movable area, wherein:
   the interior member has a fragile portion that breaks due to an input from the bag portion when the airbag device is operated, and
   at least part of end portions of the at least one display is disposed along the fragile portion; wherein the interior member includes a display end protecting portion that is integrally formed with the interior member so as to cover the end portion of the at least one display.

2. The display apparatus for a vehicle according to claim 1, further comprising:
   a display control device that is disposed at a position away from the movable area and that drives the at least one display in order to cause the at least one display to display an image; and
   a flexible wiring portion that connects the at least one display to the display control device and that has flexibility so as to be able to bend when the movable area swings.

3. The display apparatus for a vehicle according to claim 1, wherein:

the at least one display comprises a plurality of displays provided adjacent to each other with the fragile portion disposed therebetween, and the plurality of displays form a multi-display.

4. The display apparatus for a vehicle according to claim 1, wherein the at least one display is a light-emitting display.

5. The display apparatus for a vehicle according to claim 1, wherein the at least one display is a touch-panel display that displays an input portion for receiving a user input on a display portion of the touch-panel display.

6. The display apparatus for a vehicle according to claim 1, wherein the at least one display is provided in a center pad of a steering wheel.

7. The display apparatus for a vehicle according to claim 6, wherein the center pad includes means for preventing rotation that prevents the center pad from rotating relative to a vehicle body even when a rim portion of the steering wheel rotates.

8. The display apparatus for a vehicle according to claim 1, wherein:

the at least one display is provided in an interior member that is part of a surface of an instrument panel disposed so as to oppose a passenger seat, and the airbag device is an airbag device for a passenger seat contained in the instrument panel.

9. The display apparatus for a vehicle according to claim 1, wherein:

the at least one display is provided in an interior member that is part of a pillar trim, and the airbag device is an airbag device for side crash protection, and at least part of the airbag device for side crash protection is contained in the pillar trim.

* * * * *